United States Patent [19]

Kataoka et al.

[11] Patent Number: 4,559,644
[45] Date of Patent: Dec. 17, 1985

[54] IMAGE PROCESSING APPARATUS AND METHOD FOR RECOGNIZING ONLY DESIRED PATTERNS

[75] Inventors: Hiroyuki Kataoka; Yoshio Arai, both of Kanagawa, Japan

[73] Assignee: Fuji Xerox Co., Ltd., Tokyo, Japan

[21] Appl. No.: 461,711

[22] Filed: Jan. 28, 1983

[30] Foreign Application Priority Data

Jan. 29, 1982 [JP] Japan ................................. 57-11716

[51] Int. Cl.⁴ .............................................. G06K 9/18
[52] U.S. Cl. ......................................... 382/9; 235/470; 250/566; 382/17; 382/61
[58] Field of Search ....................... 382/9, 61, 48, 17; 250/255, 566, 568, 569; 235/474, 470, 454; 358/71

[56] References Cited

U.S. PATENT DOCUMENTS

| | | | |
|---|---|---|---|
| 2,231,494 | 2/1941 | Dickinson | 235/454 |
| 2,947,972 | 8/1960 | Steinbuch | 235/454 |
| 3,201,752 | 8/1965 | Rabinow | 382/9 |
| 3,467,829 | 9/1969 | Wilmotte | 250/555 |
| 3,810,094 | 5/1974 | Mori et al. | 382/61 |
| 4,377,803 | 3/1983 | Lotspiech et al. | 382/9 |

Primary Examiner—Leo H. Boudreau
Assistant Examiner—Joseph Mancuso
Attorney, Agent, or Firm—Sughrue, Mion, Zinn, Macpeak, and Seas

[57] ABSTRACT

An apparatus and method for reading, processing, storing and later printing out stored data from an original document in which undesired data portions are prevented from being recorded. Portions of the printed original image which are desirably retained and recorded are printed with solid lines, while image portions, for instance, ledger lines, which are desirably not retained and recorded, are printed as optically fine discontinuous patterns. The original thus printed is scanned line by line. The analog signal which is produced by the scanning device has high frequency portions when an optically fine discontinuous pattern is scanned. These portions are eliminated by low-pass filtering or by determining the degree of correlation between the sensor output signal and stored data representing the optically fine discontinuous patterns.

6 Claims, 12 Drawing Figures

| No. | NAME | ADDRESS |
|---|---|---|
| | ADDRESS BOOK | |
| 1 | Richard C. Sughrue | 1776 K Street, N.W. |
| 2 | John H. Mion | 2887 L Street, N.W. |
| | | |
| 30 | Neil B. Siegel | 3998 M Street, N.W. |

STAMP

Mr. Richard C. Sughrue

1776 K Street, N.W.
Washington, DC 20006

FIG. 5
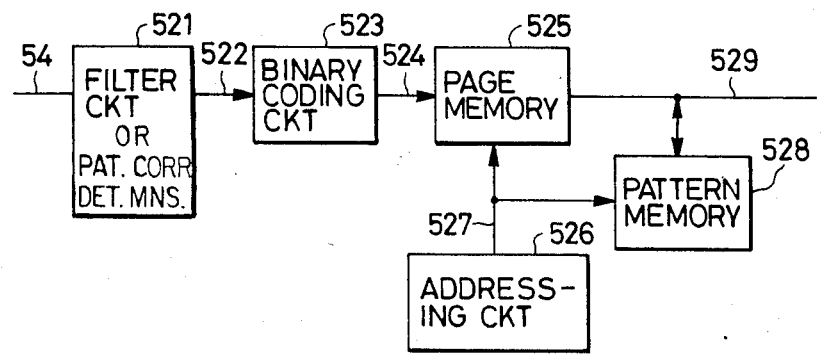
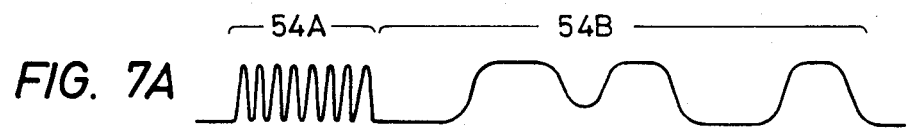
FIG. 7A
FIG. 7B
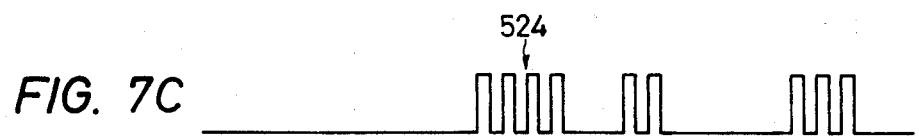
FIG. 7C

6A

IMAGE PROCESSING APPARATUS AND METHOD FOR RECOGNIZING ONLY DESIRED PATTERNS

BACKGROUND OF THE INVENTION

The present invention relates to an image processing apparatus and method with which only selected parts of the image data which makes up an original image are read, processed and recorded.

More specifically, the invention pertains to such an image processing apparatus and method in which video data of an original image is read by a photoelectric sensor, suitably processed, and at a later time, the processed data is printed out.

Yet more specifically, the invention pertains to such an image processing apparatus and method in which, for instance, names and addresses are read from an address ledger using a photoelectric sensor, the data thus read is processed and stored in a memory, and the processed data is later employed to print names and addresses on envelopes.

FIG. 2 shows an example of a recorded image, specifically, a name and address, properly printed on an envelope 2. Following customary form, the name is printed on the first line and the address on the two following lines. If desired, the name may be printed with characters larger then those used for printing the address.

FIG. 1 shows an example of a portion of an address ledger from which the data used to print the envelope shown in FIG. 2 may be derived. To print envelopes such as that shown in FIG. 2, the address ledger 1 is set in place on a platen (or an original holding plate) and the image data thereon is scanned with a photoelectric sensor. The data read by scanning this image is processed and stored in a memory.

The prior art image processing apparatus suffered an important drawback. Particularly, the entries in the address ledger 1 are separated by ruled lines 3 printed at predetermined intervals. If the address ledger 1 is correctly set in place on the platen during the scanning operation, each name and address will be correctly selected from the image, processed, stored, and later printed on an envelope. However, if the address ledger 1 is not correctly set in place on the platen, the sensor may read portions of the lines 3 which separate the various entries in the address ledger 1. An example of this is shown in FIG. 3 where it may be seen that portions 4 of the ruled lines are printed in addition to the name and address. This considerably degrades the quality of the recorded image, and may result in confusion by the Post Office, possibly causing the letter to be misdelivered.

In order to prevent this situation from happening, heretofore a method has been employed in which a particular color to which the photoelectric sensor is not sensitive is used to print the lines 3 in the address ledger 1. However, employment of this technique is disadvantageous in that the printing costs are increased due to the necessity of using two different ink colors. Also, this technique is disadvantageous in that the ruled lines may not be visually clear, thereby leading to errors.

In view of the foregoing, an object of the present invention is to provide an image processing apparatus and method in which ruled lines which separate the various entries in an address ledger need not be printed n a different color ink than names and addresses, yet these lines will not be reproduced in the event that the address ledger is somewhat misplaced on the reading plate.

SUMMARY OF THE INVENTION

The foregoing and other objects of the invention have been achieved by the provision of an imaging processing apparatus and method in which ruled lines (or other indicia which are desirably not to be reproduced) are printed as optically fine discontinuous patterns. Circuitry is then provided for recognizing these optically fine discontinuous patterns and eliminating from the output signals of a photoelectric sensors used to scan the original portions corresponding to such patterns. This circuitry may take the form of a low-pass filter, or a correlation or comparison circuit.

BRIEF DESCRIPTION OF THE DRAWINGS

FIG. 5 is a block diagram showing a processing section of FIG. 4 in more detail;

FIGS. 7A-7C are waveform diagrams used for illustrating steps in the processing of signals in the processing section of FIG. 5.

DESCRIPTION OF THE PREFERRED EMBODIMENTS

The invention will now be described with reference to preferred embodiments thereof.

Figure 4:
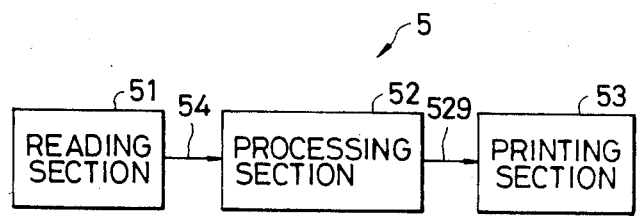
FIG. 4 is a block diagram showing an image processing apparatus in accordance with the invention.

FIG. 4 shows in block diagram form an imaging processing apparatus. This apparatus includes a reading section 51, a processing section 52 and a printing section 53. The reading section 51, whch includes a photoelectric sensor, is used to read an original document, for instance, using a raster scanning technique. The reading section 51 produces analog video signal 54 corresponding to the image read from the original document. The signal 54 is applied to a processing section 52 where it is processed and stored. When it is desired to print the stored data, the processing section 52 produces a signal 529 which is used to operate a printing section 53.

FIG. 5 is a block diagram showing the processing section 52 in more detail. The output analog signal 54 from the reading section 51 is first passed through a filter circuit 521, which is preferably a low-pass filter. The output signal 522 from the filter circuit 521 is passed to a binary coding circuit 523 where it is digitally encoded. The output digital signals 524 from the binary coding circuit 523 are then stored in a page memory 525 line by line under the control of addressing signals 527 produced by an addressing circuit 526. The page memory 525 stores a single page of data. The pages of data from the page memory 525 are successively stored in a pattern memory 528. The operations of the various units which make up the processing section 52 shown in FIG. 5 will be described in more detail below.

Figures 1, 2:
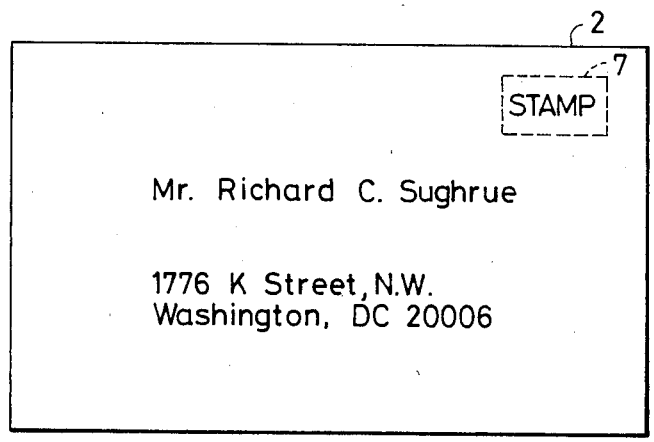
FIG. 1 is a plan view of an example of an address ledger.
FIG. 2 is a plan view showing an example of a recorded image correctly formed by an imaging processing apparatus.
Figure 3:
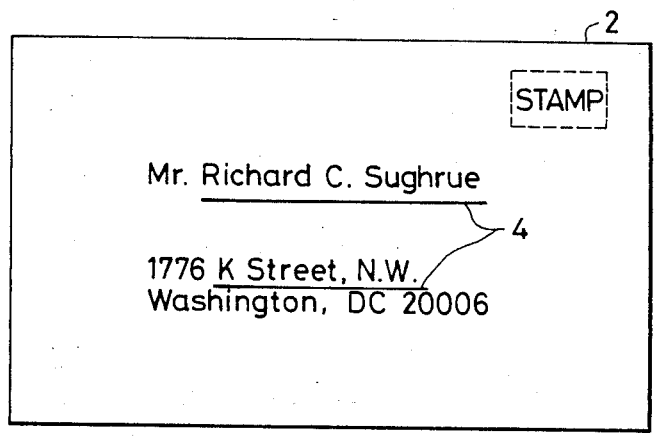
FIG. 3 is a plan view showing an example of a recorded image including unwanted lines formed by a conventional image processing apparatus.
Figure 6:
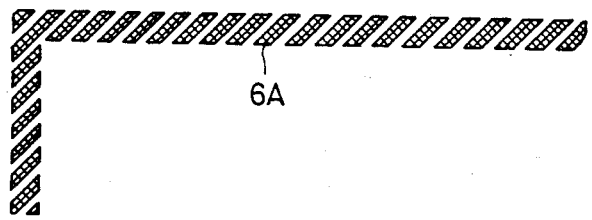
FIG. 6 is an enlarged view of a part of a ruled line which is printed on an original.
Figure 8A:
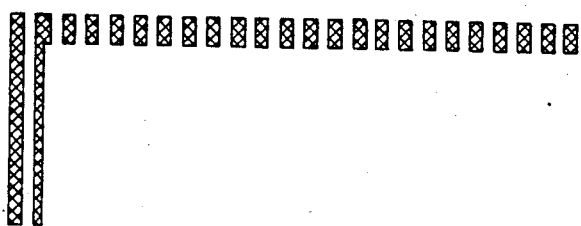
FIGS. 8A-8C are enlarged diagrams showing further examples of fine discontinuous patterns which may be printed on an original in accordance with the invention.
Figure 8B:
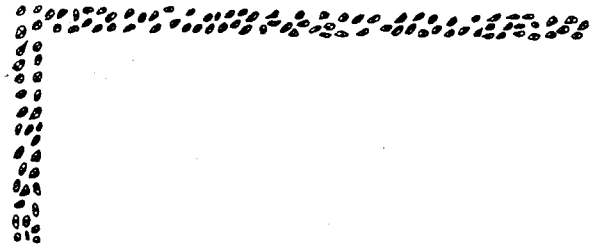
Figure 8C:
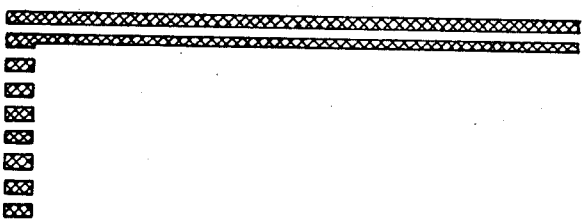

In accordance with another important feature of the invention, the lines 3 of the address ledger 1 shown in FIG. 1 are printed, not as solid lines as was done in the prior art, but as optically fine discontinuous patterns, examples of which are illustrated in FIG. 6 and FIGS. 8A-8C. For instance, the line 6A shown in FIG. 6 is formed by a number of oblique lines so as to provide 5-10 lines per millimeter. The lines 3 are printed with the same color ink as the name and address data.

FIG. 7A shows a waveform typical of an analog signal 54 which would be produced by the reading section 51 in the case where a photoelectric sensor thereof first scans a portion of one of the lines 3 and then scans data which is desired to be printed, for instance, portions of a name or address. The portion 54A of the analog signal 54 represents the portion of the line 3 scanned by the sensor, while the portion 54B of the analog signal 54 represents the desired data. The portion 54A of the analog signal 54 is of a significantly higher frequency than the portion 54B. Thus, after passing through the filter circuit 521, the portion 54A is eliminated. This is illustrated in FIG. 7B.

The analog signal of FIG. 7B is sampled at a predetermined clock frequency by the binary coding circuit 523, thereby providing a digital video signal 524 as illustrated in FIG. 7C. The digital video signal 524 is then stored in the page memory 525 line by line. When digital video signal data representing an entire page of the original has been stored in page memory 525, the addressing circuit 526 outputs an address signal 527 which causes the transfer of this data into the pattern memory 528.

When it is desired to print envelopes, the addressing circuit 526 is activated to address the pattern memory 528 with appropriate addressing signals 527. For example, the addressing circuit 526 may first read out from the pattern memory 528 digital data, stored in the pattern memory 528 in advance, representing the stamp placing area 7. A printing data signal 529 is applied to the printing section 53 accordingly. The printing section 53, which may include a thermal recording head, for instance, then prints out this data line by line. Next, the addressing circuit 526 provides as an addressing signal 527 contains address data representing the name portion to be printed on the envelope. As a result, the name is printed. Finally, an addressing signal 527 is produced which causes the street and city lines of the address to be read and printed out. If the data of the name line is read twice, the name may be enlarged when printing.

If desired, the filter circuit 521 can be replaced by a pattern comparison and recognition circuit, for example, a correlation detection circuit. In this case, data corresponding to the signal pattern which would be produced when one of the lines 3 is scanned is stored in the processing section 52 and compared with the analog signal 54 continuously. If the correlation between the analog signal 54 and the stored data is above a certain level, the corresponding portions of the analog signal 54 are eliminated.

With the invention, unwanted line portions are eliminated. However, if it is desired to include a ruled line as part of the recorded data, this can easily be accomplished by printing it as a solid line.

This completes the description of the preferred embodiments of the invention. Although preferred embodiments have been described, it is believed that numerous modifications and alterations thereto would be apparent to one of ordinary skill in the art without departing from the spirit and scope of the invention.

We claim:

1. A method for selectively reading, processing and recording data images from an original document, comprising the steps of:
   printing on an original document image data desired to be recognized with solid lines and printing image data desired to not be recognized as optically fine discontinuous lines, wherein said discontinuous lines comprise optically fine discontinuous patterns and wherein said patterns are substantially smaller than said discontinuous lines;
   scanning said original document in a raster scanning pattern with a photoelectric image sensor; and
   recognizing in an analog output signal from said photoelectric image sensor signal portions which correspond to a printed optically fine discontinuous pattern and eliminating from said analog signal portions thereof corresponding to said optically fine discontinuous patterns.

2. The method of claim 1, wherein said step of recognizing and eliminating comprises subjecting said analog signal to low-pass filtering.

3. The method of claim 1, wherein said step of recognizing and eliminating comprises: storing data representing an optically fine discontinuous pattern; determining a degree of correlation between said analog signal and said data representing said optically fine discontinuous pattern; and eliminating active signal portions from said analog signal when said degree of correlation is above a predetermined level.

4. An imaging processing apparatus of a type having a reading section for reading data patterns printed on an original document, a processing section for storing and processing data corresponding to data images read from an original document, and a printing section for printing at least predetermined portions of the data stored in the processing section, wherein the improvement comprises said processing section being provided with means for recognizing and eliminating lines recorded on an original document, wherein said lines comprise optically fine discontinuous patterns and wherein said patterns are substantially smaller than said lines.

5. The imaging processing apparatus of claim 4, wherein said recognizing and eliminating means comprises a low-pass filter for filtering an analog signal produced by said reading section for suppressing a high frequency component in said analog signal.

6. The imaging processing apparatus of claim 4, wherein said recognizing and eliminating means comprises pattern correlation detecting means for determining correlation between output signals from said reading section and data representing a stored pattern.

* * * * *